US011388905B2

(12) United States Patent
Meerdink et al.

(10) Patent No.: US 11,388,905 B2
(45) Date of Patent: Jul. 19, 2022

(54) METHOD AND AN APPARATUS FOR PROCESSING A HALF PIG CARCASS PART HANGING FROM A CARRIER

(71) Applicant: MAREL MEAT B.V., Boxmeer (NL)

(72) Inventors: Jan Johannes Meerdink, Ravenstein (NL); Franciscus Theodorus Henricus Johannes Van Der Steen, Megen (NL); Adriaan Ebergen, Lith (NL); Ronald Kranenbarg, 'S-Hertogenbosch (NL)

(73) Assignee: MAREL MEAT B.V., Boxmeer (NL)

( * ) Notice: Subject to any disclaimer, the term of this patent is extended or adjusted under 35 U.S.C. 154(b) by 0 days.

(21) Appl. No.: 17/605,484

(22) PCT Filed: May 1, 2020

(86) PCT No.: PCT/EP2020/062202
§ 371 (c)(1),
(2) Date: Oct. 21, 2021

(87) PCT Pub. No.: WO2020/225153
PCT Pub. Date: Nov. 12, 2020

(65) Prior Publication Data
US 2022/0142184 A1    May 12, 2022

(30) Foreign Application Priority Data

May 3, 2019   (NL) ..................................... 2023064

(51) Int. Cl.
*A22B 5/00*        (2006.01)
(52) U.S. Cl.
CPC ............ *A22B 5/0041* (2013.01); *A22B 5/007* (2013.01)

(58) Field of Classification Search
CPC .......... A22B 5/00; A22B 5/0041; A22B 5/007
(Continued)

(56) References Cited

U.S. PATENT DOCUMENTS 2,102,084 A    12/1937  Miller
3,940,998 A     3/1976  Sourby et al.
(Continued)

FOREIGN PATENT DOCUMENTS

CN     1368009 A     9/2002
CN   101032259 A     9/2007
(Continued)

OTHER PUBLICATIONS

International Search Report and Written Opinion from PCT Application No. PCT/EP2020/062202, dated Jun. 9, 2020.
(Continued)

*Primary Examiner* — Richard T Price, Jr.
(74) *Attorney, Agent, or Firm* — Workman Nydegger

(57) ABSTRACT

A system and a method for separating a middle portion of a half pig carcass, hanging from an overhead conveyor in a carrier, by cutting between the hip bone and the chine bone (backbone) and optionally between the tail bone and the hip bone, the cut causing a middle portion of the half pig carcass part to be partly separated from the remaining half pig carcass part via gravity. Further cutting the connection between the middle part of the half pig carcass part along a curve along the muscle defining the ham cut to separate the middle portion from the rest of the half pig carcass part causing the ham part of the half pig carcass part to remain hanging in the carrier.

15 Claims, 6 Drawing Sheets

(58) Field of Classification Search
USPC .......................................................... 452/156
See application file for complete search history.

(56) References Cited

U.S. PATENT DOCUMENTS

| | | | |
|---|---|---|---|
| 4,667,371 A | 5/1987 | Vogt | |
| 5,314,375 A | 5/1994 | O'Brien et al. | |
| 5,746,648 A | 5/1998 | Boeyen et al. | |
| 5,855,507 A | 1/1999 | Fisher et al. | |
| 6,558,243 B2 | 5/2003 | Minemura et al. | |
| 8,986,081 B2* | 3/2015 | Ueffing | A22B 5/0023 452/156 |
| 9,091,673 B2* | 7/2015 | Fern | A22B 5/0041 |
| 10,726,537 B2* | 7/2020 | Eger | G06T 7/0004 |
| 2001/0034201 A1 | 10/2001 | Bell et al. | |
| 2002/0102932 A1 | 8/2002 | Minemura et al. | |

FOREIGN PATENT DOCUMENTS

| | | |
|---|---|---|
| CN | 103081977 A | 5/2013 |
| CN | 107668151 A | 2/2018 |
| EP | 0365453 A1 | 4/1990 |
| EP | 0743618 A2 | 11/1996 |
| FR | 2940747 A1 | 7/2010 |
| JP | 2000125754 A | 5/2000 |
| JP | 2013031916 A | 2/2013 |
| NL | 9402036 A | 7/1996 |

OTHER PUBLICATIONS

Search Report from corresponding NL Application No. NL2023064, dated Jan. 24, 2020.
Chinese Search Report from corresponding Chinese Application No. 202080031927.5, dated Apr. 25, 2022.
Chinese Office Action from corresponding Chinese Application No. 202080031927.5, dated Apr. 29, 2022.

* cited by examiner

METHOD AND AN APPARATUS FOR PROCESSING A HALF PIG CARCASS PART HANGING FROM A CARRIER

FIELD OF THE INVENTION

The present invention relates to the method and an apparatus for processing a half pig carcass part that is at least partly freely hanging from a carrier, which carrier engages the hind leg part of the half pig carcass part.

BACKGROUND OF THE INVENTION

It is known to transport slaughter animal carcass parts hanging suspended from carriers engaging in holes in leg portions of the carcass parts. The carcass parts may be a half carcass that has been eviscerated and cleaned. The carriers used may be of the gambrel type, having two opposed carrier ends pointing away from each other and being tied together with a cross bar. The cross bar has a hanging arrangement that cooperates with an overhead transport conveyor system. Another type of carrier may be the Euro Hook variant, having a pointed end and a carrier portion shaped like a fishing carrier. The Euro Hook also has a hanging arrangement that cooperates with an overhead transport conveyor system similar to that used for gambrels. The single carriers may comply with DIN 5047 (Carriers for meat and other food; tubular track sliding carrier).

Traditionally, a half carcass of a pig is divided into fore end, middle portion and rear end (or ham) before further deboning and other processing. The division into three parts may take place on a processing table, where the half carcass part is lying horizontally, or it may be taking place when the half carcass is still hanging, either stationary or mobile. The cutting itself is done using a saw type rotating blade. This has some perceived disadvantages. First, the generation of an excessive amount of meat and bone dust, which diminishes the quality of the product(s) generated. Second, the cut across the rib portion will cut through ribs and the cut across the shoulder blade will cut a piece of the shoulder blade off leaving sharp bone ends that detract from consumer acceptance. Third, the cut between the ham and middle portion leaves a large amount of high-quality meat on the middle portion because of the straight cut performed by the saw type rotating blade.

SUMMARY OF THE INVENTION

Embodiments of the invention preferably seeks to mitigate, alleviate or eliminate one or more of the above-mentioned disadvantages singly or in any combination. In particular, it may be seen as an object of embodiments of the present invention to provide a method for processing a half pig carcass part that is at least partly freely hanging from a carrier, where the carrier engages the hind leg of the half pig carcass part. The half carcass part may include a fore end portion, but in most cases the fore end will already have been removed from the half pig carcass part when the method according to the invention is used.

According to a first aspect of the invention, there is provided a method of processing a half pig carcass part that is at least partly freely hanging from a carrier, which carrier engages the hind leg part of the half pig carcass part, comprising:
detecting positions of bones in a rear portion of the half pig carcass part,
identifying positions of the tail bone (caudal vertebrae 1, such as caudal vertebrae 1 to 4), the chine bone (the lumbar vertebrae adjacent the sacral vertebrae, such as lumbar vertebrae 7), and the hip bone (ilium), and based on the identified positions,
cutting by a cutting device through a half pig carcass part portion between the hip bone and the chine bone, the cut causing a middle portion of the half pig carcass part to be partly separated from the remaining half pig carcass part via gravity.

The invention may be advantageous for providing a method enabling partly separating a middle portion of the half pig carcass part from the remaining half pig carcass part and utilizing gravity for this purpose. It may furthermore be seen as an advantage that detecting positions of bone, identifying positions of certain bones and cutting based on said identified positions may be beneficial for enabling cutting in an advantageous manner, e.g., for enabling cutting through one or more joints rather than bones and/or for cutting so as to have a larger amount of meat on a certain one of two resulting parts.

By 'tail bone' may be understood the caudal vertebrae 1 to 4.

By 'chine bone' is understood the lumbar vertebrae adjacent the sacral vertebrae, such as the last lumbar vertebrae in a caudal (towards the tail) direction. It is understood that pigs may have a varying number of lumbar vertebrae (such as 5-7), and the chine bone is the lumbar vertebrae with the highest number (counting in a direction from head to tail), such as for example 'lumbar vertebrae no. 5' in a pig with 5 lumbar vertebrae and 'lumbar vertebrae no. 7' in a pig with 7 lumbar vertebrae.

By 'hip bone' may be understood the ilium.

By 'between the hip bone and the chine bone' may be understood one or more or all of between the hip bone and the sacral vertebrae (such as through the joint between the hip bone and the sacral vertebrae, such as through a sacroiliac joint), through or between parts of the sacral vertebrae (such as through the sacrum), between the sacral vertebrae and the chine bone (such as between the joint between the sacral vertebrae and the chine bone, such as through a lumbosacral joint at the lumbosacral vertebral junction).

According to an alternative first aspect, a method is provided comprising:
detecting at least one characteristic property of the half pig carcass part including positions of the bones in a rear portion of the half pig carcass part,
identifying positions of the tail bone (caudal vertebrae 1 to 4), the chine bone (lumbar vertebrae 7), and the hip bone (ilium), and based on the identified positions,
cutting by a cutting device through a half pig carcass part portion between the hip bone and the chine bone (backbone), the cut causing a middle portion of the half pig carcass part to be partly separated from the remaining half pig carcass part via gravity.

According to an embodiment the cutting is through a joint, such as a lumbosacral joint at the lumbosacral vertebral junction or a sacroiliac joint. A possible advantage of this may be that cutting through a joint (such as a joint between two adjacent bones) enables dispensing with a need to cut through bone, which may in turn enable one or more of less resource demanding cutting, less resulting bone dust, less resulting sharp bone ends.

By cutting through a joint may be understood cutting in space, such as exclusively in space, outside of bone. Cutting through a joint may be understood as not cutting through bone.

According to an embodiment the cutting is between the hip bone and the sacral vertebrae and/or wherein the cutting is between the sacral vertebrae and the chine bone. By cutting in one or both of these two positions, the cutting can separate the hip bone from the chine bone, such as enabling partly separating a middle portion of the half pig carcass part from the remaining half pig carcass part via gravity, without necessarily cutting through bone.

According to an embodiment, the cutting is through the sacral iliac joint.

By 'sacral iliac joint' may be understood a sacroiliac joint and/or the joint between on the one side the hip bone (ilium) and on the other side the sacral vertebrae or sacrum. A possible advantage of this may be that it enables leaving a relatively large amount of meat with a middle portion of the half pig carcass part (such as relative to a ham portion). Another possible advantage may be that, via gravity, a natural separation may occur between the tail bone and the hip bone. Another possible advantage may be that the tail bone is cut free of the ham part (and is optionally attached to the spine to still being a part of the middle part).

According to a further embodiment, the method is further comprising:
performing a further cut through the spine, such as performing a further cut between the chine bone and the sacral vertebrae.

By 'spine' may in this context be understood the bones comprising the lumbar vertebrae, the sacral vertebrae and the caudal vertebrae, such as the caudal vertebrae 1-4. The further cut through the spine may be carried out so as to partially or fully sever a middle portion of the half pig carcass part from the ham portion and/or a tail part.

According to an embodiment, the further cut may be between the chine bone and the lumbar vertebrae. A possible advantage of this may be that the tail bone may thus be cut free of both the ham part as well as the middle part. The further cut between the chine bone and the lumbar vertebrae may be carried out so as to partially or fully sever a middle portion of the half pig carcass part from the ham portion and/or a tail part.

In one embodiment, the method further comprises the steps of:
identifying the position between the tail bone and the hip bone, and
performing a further cut between the tail bone and the hip bone.

A possible advantage of this may be that a tail bone may be cut free of the ham part. It may be understood that the further cut is different with respect to the cutting described above. Thus, while the possible positions for the cutting and the further cut may be overlapping, the cutting and the further cut may be inherently different.

By 'between the tail bone and the hip bone' may be understood one or more or all of between the tail bone and the sacral vertebrae (such as through the joint between the tail bone and the sacral vertebrae), between parts of the sacral vertebrae (such as through the sacral vertebrae), between the sacral vertebrae and the chine bone (such as between the joint between the sacral vertebrae and the chine bone).

According to a further embodiment the further cut is through a joint. A possible advantage of this may be that cutting through a joint (such as a joint between two adjacent bones) enables dispensing with a need to cut through bone, which may in turn enable one or more of less resource demanding cutting, less resulting bone dust, less resulting sharp bone ends.

According to another further embodiment, and as may be generally understood, the further cut is different with respect to the cutting. A possible advantage of this may be that a further effect may be achieved by the further cut, such as in addition to partly separating a middle portion of the half pig carcass part from the remaining half pig carcass part via gravity, a tail bone may be cut free of the ham part.

According to another further embodiment the further cut is a cut between the hip bone and the sacral vertebrae and/or wherein the further cut is a cut between the sacral vertebrae and the tail bone. By cutting in one or both of these two positions, the cutting can separate the hip bone from the tail bone without necessarily cutting through bone.

In one embodiment, the method further comprises the steps:
separating by the cutting device the half pig carcass portion connection between the middle part of the half pig carcass part along a curve along the muscle defining the ham cut to separate as much meat onto the middle portion as opposed to on the ham part, causing the ham part of the half pig carcass part to remain hanging in the carrier.

A possible advantage may be that this embodiment enables having a larger amount of meat on a middle part compared to a ham part, which may in turn be advantageous for leaving a large (or larger) amount of high-quality meat on the middle portion. This may be beneficial, e.g., for increasing a value (in terms of usability and/or costs) of the resulting parts (such as the middle part and the ham part).

The step of detecting positions of the bones in the rear portion of the half pig carcass part may be performed by a detection apparatus.

The step of detecting at least one characteristic property of a half pig carcass part including positions of the bones in the rear portion of the half pig carcass part may be performed by a detection apparatus.

In one embodiment, the detection apparatus may include one or more of the following:
a laser scanner for scanning and generating a three-dimensional image data of one and/or both sides of the half pig carcass part,
a digital imaging device for capturing three-dimensional image data of one and/or both sides of the half pig carcass part, and
an X-ray apparatus for capturing X-ray data indicating inner bone structure of the half pig carcass part including the positions of the ribs of the half pig carcass part.

The method further may comprise processing detected data using a control and processing unit connected to the detection apparatus to determine the positions of the tail bone (caudal vertebrae 1 to 4), the chine bone (lumbar vertebrae 7 in case of a pig with 7 lumbar vertebrae), and the hip bone (ilium).

According to a second aspect of the invention an apparatus is provided for apparatus for processing a half pig carcass part that is at least partly freely hanging from a carrier, which carrier engages the hind leg part of the half pig carcass part, comprising:
a detection device for detecting positions of bones in a rear portion of the half pig carcass part,
an identification device for identifying positions of the tail bone (caudal vertebrae 1, such as caudal vertebrae 1 to 4), the chine bone (the lumbar vertebrae adjacent the sacral vertebrae, such as lumbar vertebrae 7), and the hip bone (ilium), and based on the identified positions,
a cutting device for cutting through a half pig carcass part portion between the hip bone and the chine bone, the cut causing a middle portion of the half pig carcass part to be partly separated from the remaining half pig carcass part via gravity.

According to an alternative aspect, an apparatus is provided for processing a half pig carcass part that is at least partly freely hanging from a carrier, which carrier engages the hind leg part of the half pig carcass part, comprising:
a detection device for detecting at least one characteristic property of the half pig carcass part including positions of the bones in a rear portion of the half pig carcass part,
an identification device for identifying positions of the tail bone (caudal vertebrae 1, such as caudal vertebrae 1 to 4), the chine bone (the lumbar vertebrae adjacent the sacral vertebrae, such as lumbar vertebrae 7), and the hip bone (ilium), and based on the identified positions,
a cutting device for cutting through a half pig carcass part portion between the hip bone and the chine bone (backbone), the cut causing a middle portion of the half pig carcass part to be partly separated from the remaining half pig carcass part via gravity.

According to an embodiment, the cutting device is arranged for cutting through a joint.

The apparatus may further comprise:
the identification device being adapted to identify the position between the tail bone and the hip bone, and using this position information, the cutting device is adapted to perform a further cut between the tail bone and the hip bone.

According to a third aspect, there is presented use of an apparatus according to the second aspect, for processing a half pig carcass part that is at least partly freely hanging from a carrier, such as for carrying out a method according to any method according to the first aspect.

Accordingly, a method and an apparatus and a use of the apparatus is provided that among other things allows automation of separating a hanging half carcass into fore end, middle portion and ham. Further, the yield of each part is optimized by allowing precise cuts along muscle contours and bone structures.

BRIEF DESCRIPTION OF THE DRAWINGS

Embodiments of the invention will be described, by way of example only, with reference to the drawings, in which.

DESCRIPTION OF EMBODIMENTS

Figure 1:
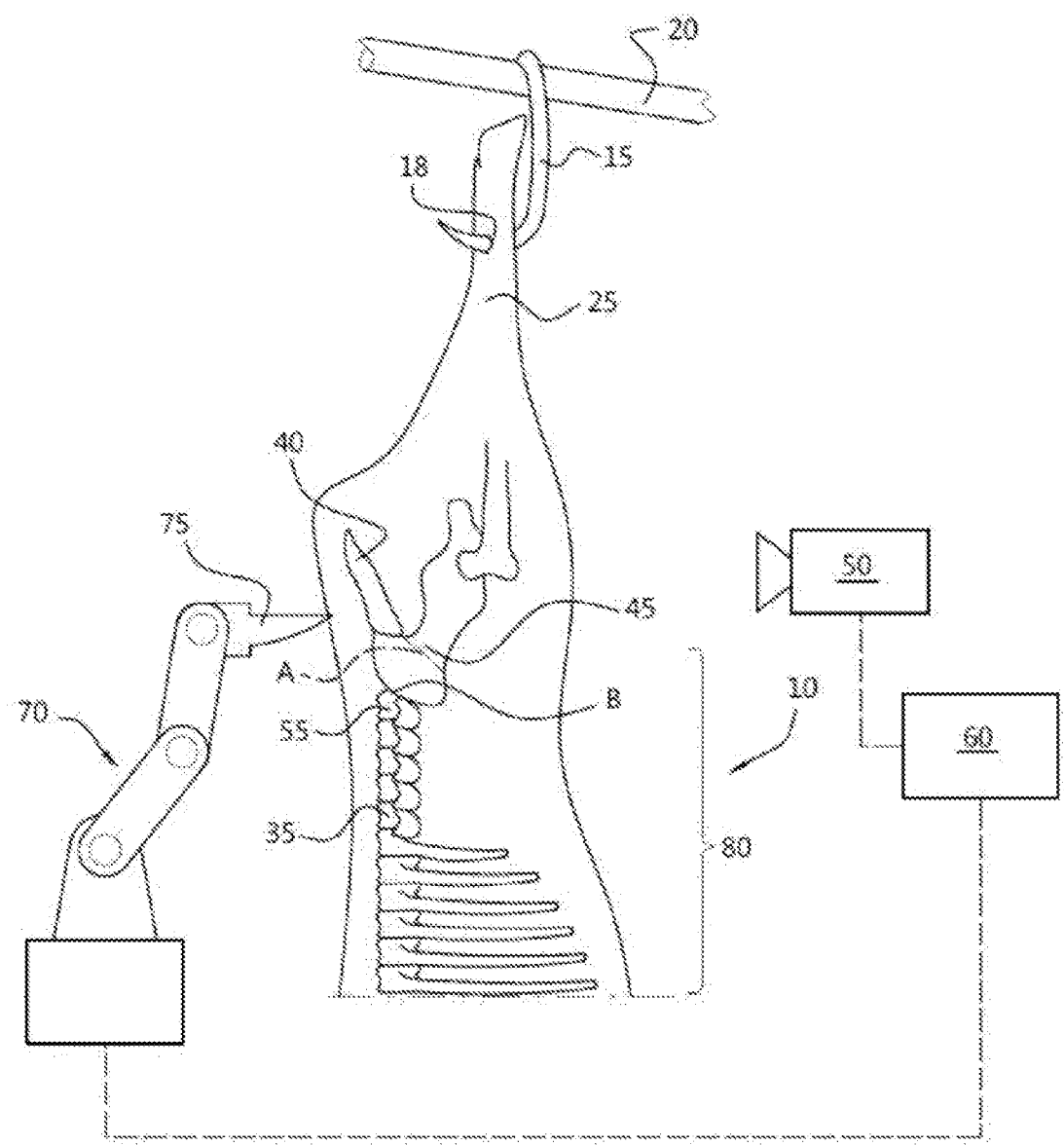
FIG. 1 is a schematic side view showing a half carcass hanging from an overhead transfer system according to an embodiment of the invention.

Referring to FIG. 1, a pig half carcass 10, that advantageously has been eviscerated and cleaned, is hanging from a carrier 15 of an overhead transport system 20. The transport system is depicted as a simple single hook conveyor system, but may be any type of overhead transport system suitable of carrying and transporting a pig half carcass, utilizing any type of suitable carrier. There are several suitable known transport systems that may be used and that are well known to a person skilled in the art.

The half carcass 10 is hanging from the carrier 15 via a hole or opening 18 in a hind leg 25 of the carcass. The half carcass has a spine portion 35, which is visible after the splitting of the whole carcass along the spine in an earlier operation (not shown). Further, a number of bones are visible in the rear portion of the carcass: the tail bone 40 (caudal vertebrae 1 to 4), the chine bone 55 (lumbar vertebrae 7, where the depicted pig has 7 lumbar vertebrae), and the hip bone 45 (ilium).

To begin processing the half pig carcass part, at least one characteristic property of the half pig carcass 10 is detected using a detection apparatus 50, including positions of the tail bone 40, the chine bone 55, and the hip bone 45 of the half pig carcass part. The detection apparatus 50 may include one or more of the following:
a laser scanner for scanning and generating a three-dimensional image data of one and/or both sides of the half pig carcass 10,
a digital imaging device for capturing three-dimensional image data of one and/or both sides of the half pig carcass 10, and
an X-ray apparatus for capturing X-ray data indicating inner bone structure of the half pig carcass 10 including the positions of the bones of the half pig carcass.

The resulting data, e.g. X-ray data, is processed using the control and processing unit 60 connected to the detection apparatus 50 to determine the positions of the bones. Based on the determined positions, the reference points A (joint between tail bone and hip bone) and B (joint between hip bone and chine bone) may be determined. All this data, in particular the reference points A and B, may then be stored in a memory of a control and processing apparatus 60. The positions may be marked directly on the pig carcass. Marking may be done using a visible light beam (not shown) or edible dye (or any other form of indication) to e.g. inform an operator, or automatic cutting device, of where to begin the first cut. It may be understood that the 'first cut' may be referring to a process comprising several (first) cuts, such as a first part of the first cut and a second part of the first cut.

Before the first cut on the bones is made, at least the head (top) of the tenderloin (not shown) has to be cut free, optionally the entire tenderloin may be removed in this step.

Figure 2A:
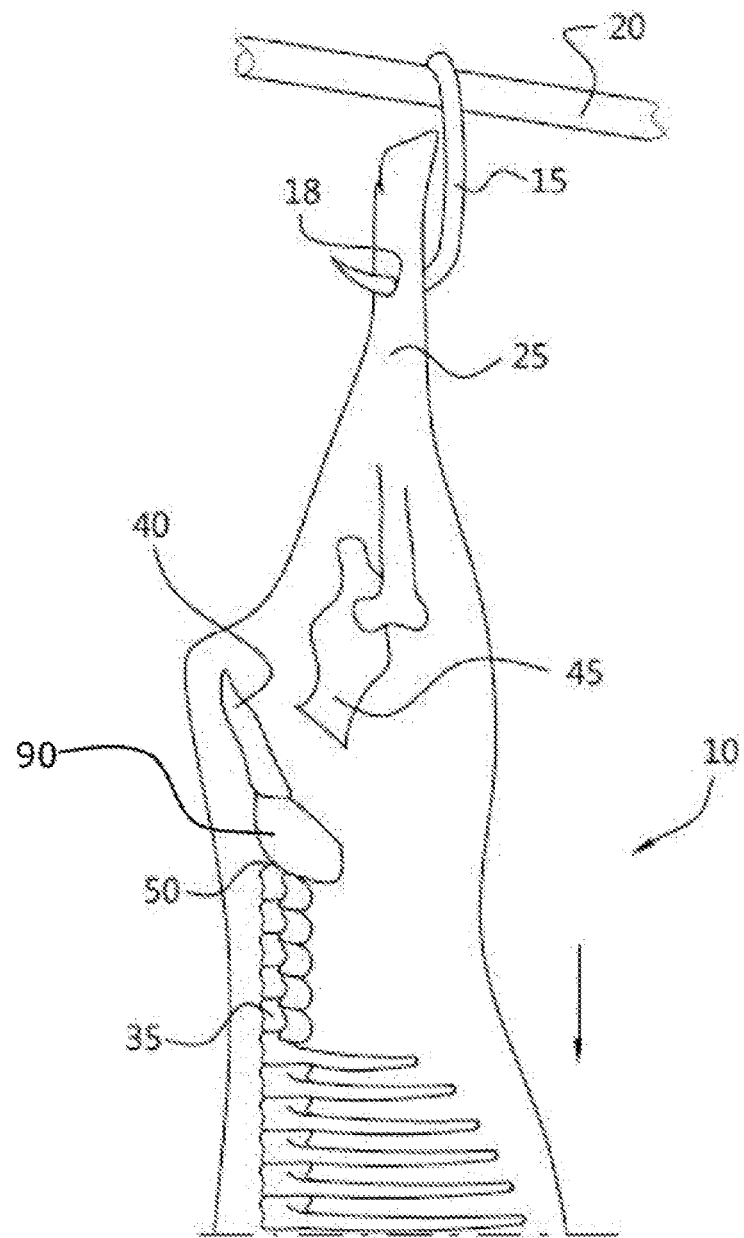
FIG. 2a is a schematic side view showing the half carcass after the first cut has been made between the tail bone and the hip bone.
Figure 2B:
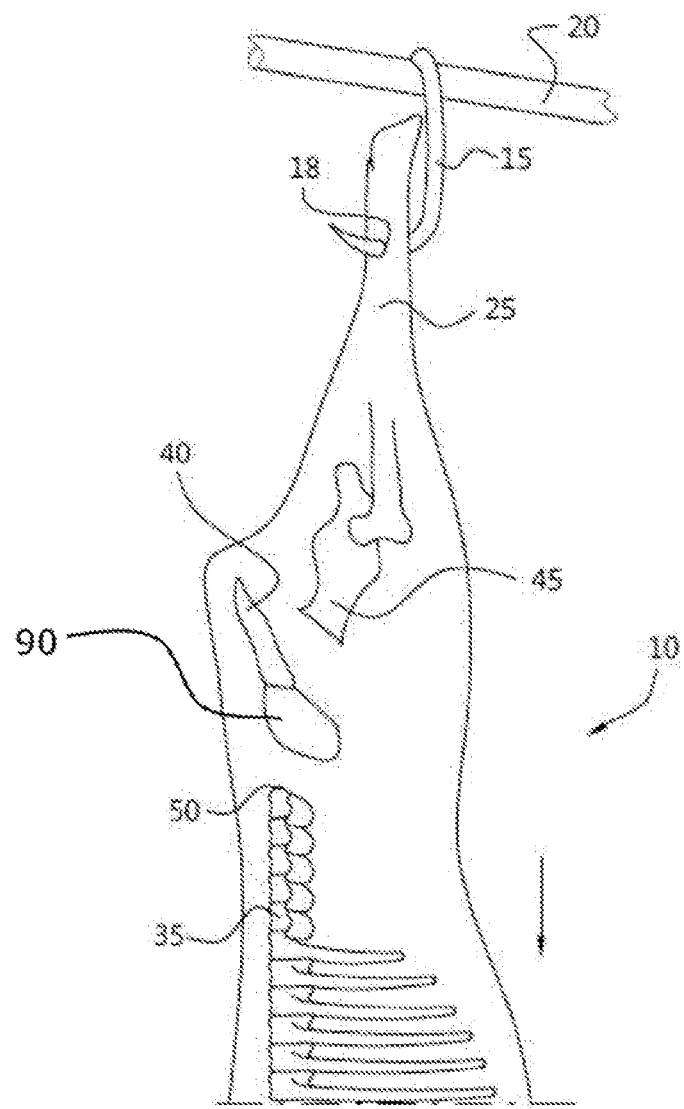
FIG. 2b is a schematic side view showing the half carcass after the first cut has been made between the tail bone and the hip bone and between the hip bone and the chine bone.

In an embodiment, the first cut is made by a cutting device 70 having a cutting blade 75, where the cut is through the joints marked by reference points A and B, such as the first part of the first cut being the cut through the joint marked by reference point A (such as between the tail bone and the hip bone, such as between the hip bone (ilium) and the sacral vertebrae) and the second part of the first cut being the cut through the joint marked by reference point B (such as between the hip bone and the chine bone, such as between the sacral vertebrae and the chine bone). Note that the joint marked by reference point B is marked with a dashed line indicating that the joint is behind the ilium (relative to the observer in the present side view). The cut, such as the first cut, such as the first part of the first cut, causes a middle portion 80 of the half carcass part 10 to be partly separated from the remaining ham of the half pig carcass 10 via gravity. The first cut may be made automatically, for instance using a robot arm carrying the cutting blade, or manually where an operator makes the cut using the cutting blade. FIG. 2a shows the situation after the first cut, such as (only) the first part of the first cut (which in FIG. 2a is through the joint between the hip bone (ilium) and the sacral vertebrae), has been made, where via gravity, a natural separation occurs between the tail bone 40 and the hip bone 45 (such as the entire hip bone). FIG. 2a also shows the sacrum 90 (the sacral vertebrae), which was in FIG. 1 hidden beneath the hip bone 45. The tail bone is thus cut free of the ham part and is attached to the spine 35 to still being a part of the middle part. In a further embodiment, FIG. 2b shows the situation after the first cut, such as the first part of the first cut and the second part of the first cut, has been made, where via gravity, a natural separation occurs between the tail bone 40 and the hip bone 45, and the hip bone 45 and the chine bone 55. The tail bone is then separated from the chine bone by the cutting device. Thus, here the tail bone has been cut free of both the ham part as well as the middle part.

It is noted that according to an alternative embodiment, the sequence of the first part of the first cut and the second part of the first cut could have been reversed.

According to another alternative embodiment, the first cut comprises cutting by a cutting device through a half pig carcass part portion between the hip bone and the chine bone, the cut causing a middle portion of the half pig carcass part to be partly separated from the remaining half pig carcass part via gravity. This first cut could correspond to any one or both of the first part of the first cut and the second part of the first cut as described above with reference to FIGS. 2A-2B. According to a further embodiment (with respect to this other embodiment), the method is further comprising performing a further cut between the tail bone and the hip bone.

Figure 3:
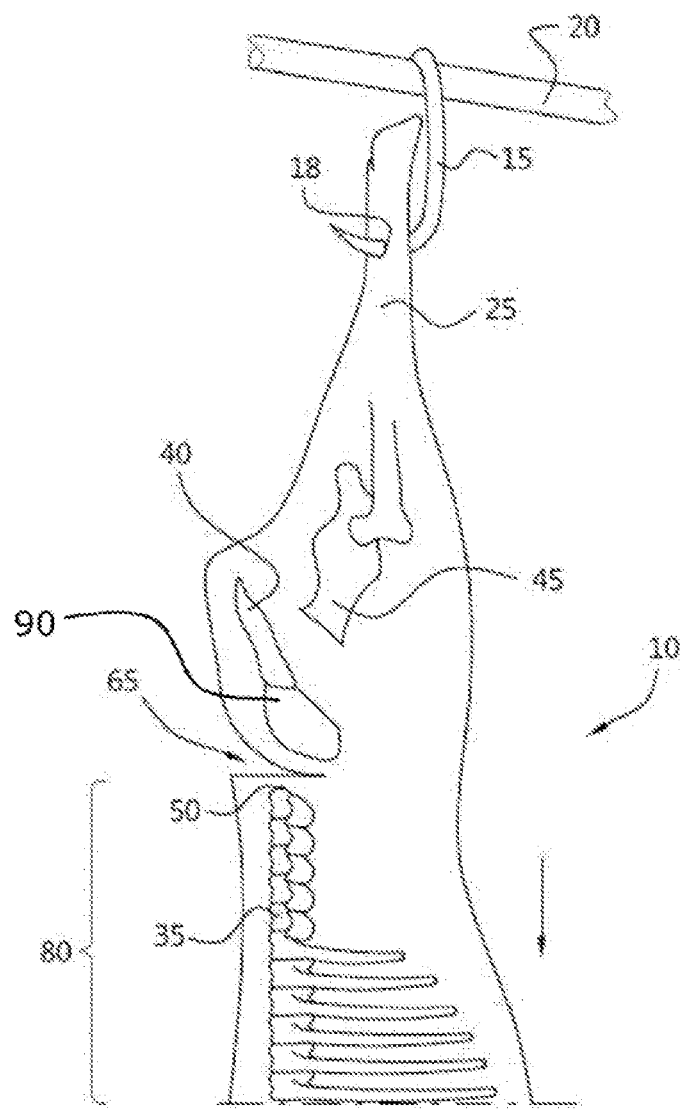
FIG. 3 is a schematic side view showing the half carcass after the first cut and after a first part of the second cut.

Thereafter, as shown in FIG. 3, a first part 65 of a second cut may be made by the cutting blade 75 to separate the carcass connection between the ham part of the half pig carcass part and to a back of the half pig carcass part. The cut is routed such that a maximum yield of meat remains with the middle portion.

Figure 4:
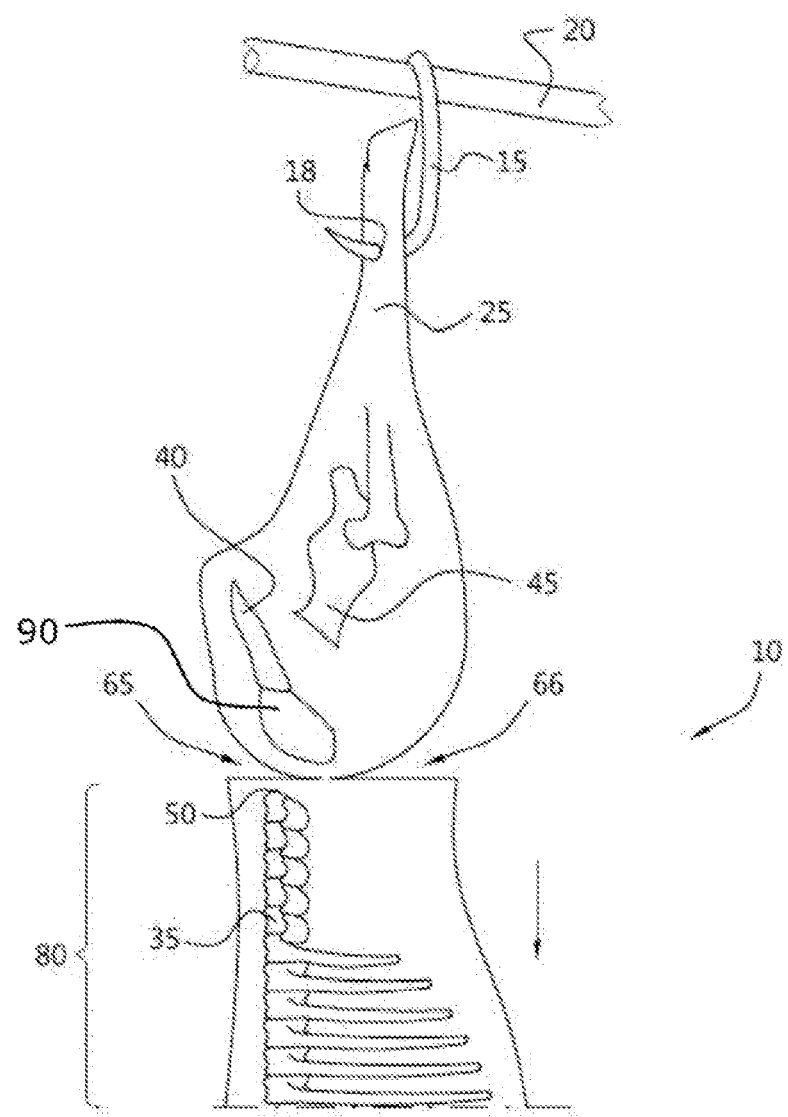
FIG. 4 is a schematic side view showing the half carcass after a second part of the second cut has been made and the middle portion is being separated from the rest of the carcass.

Similarly, as is shown in FIG. 4, a second part 66 of the second cut may be made along a curve along the muscle defining the ham to fully separate the middle portion 80 from the rest of the half pig carcass part 10 causing the ham part of the half pig carcass part to remain hanging in the carrier. The cut is routed such that a maximum yield of meat remains with the middle portion. This portion cut off the ham part and left on the middle part is generally referred to as the flank. The middle portion 80 falls to a collection device (not shown) for further processing.

It should be noted that the sequence of the steps in FIGS. 3 and 4 may be reversed. Furthermore, the flank cut described above may be performed before the cutting of the tail bone.

Figure 5:
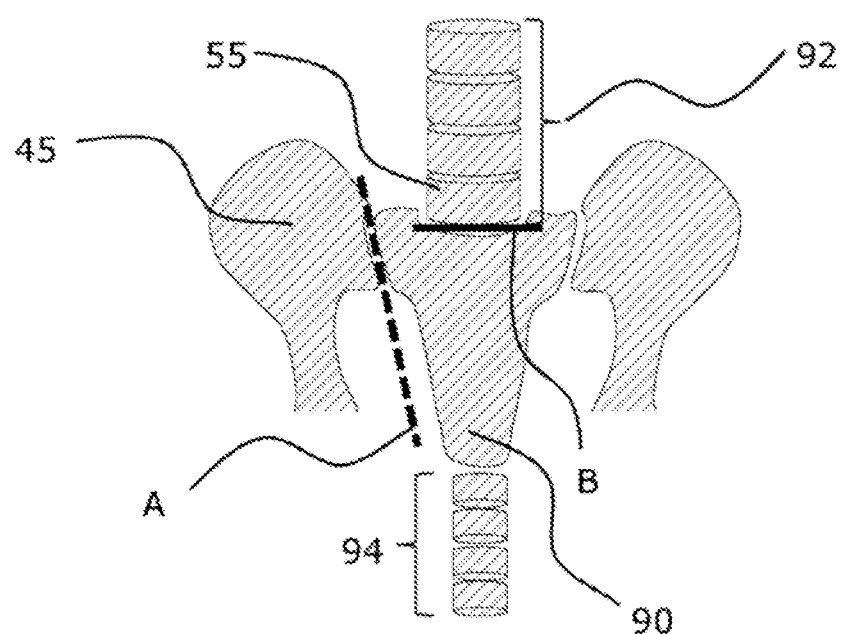
FIG. 5 shows a bottom view of skeletal bone parts from below the pig.

FIG. 5 shows a bottom view of skeletal bone parts from below the pig (where both sides are included for clarity) including a part of the hip bone (ilium) 45 (where the lower part—in the figure—is left out so as not to cover the caudal part of the sacrum and caudal vertebrae), the last (in a caudal direction) four lumbar vertebrae 92 and the chine bone 55, the sacrum 90 (sacral vertebrae) and caudal vertebrae 1-4. The figure furthermore shows the joints marked by reference points A and B (as in FIG. 1), such as joint A between the hip bone (ilium) 45 and the sacral vertebrae 90 and joint B between the sacral vertebrae 90 and the chine bone 55.

The above description of possible embodiments of the present invention should not be interpreted as limiting the scope of the present invention. Factors such as cost, mechanical stability and weight of components will dictate what solution is chosen for each case.

Clauses

There is furthermore presented a method of processing a half pig carcass part that is at least partly freely hanging from a carrier, and an apparatus for processing a half pig carcass part that is at least partly freely hanging from a carrier according to the clauses below, which clauses may be combined with any of the preceding claims and/or any of the appended claims:

1. A method of processing a half pig carcass part that is at least partly freely hanging from a carrier, which carrier engages the hind leg part of the half pig carcass part, comprising:

detecting at least one characteristic property of the half pig carcass part including positions of the bones in a rear portion of the half pig carcass part, identifying positions of the tail bone (caudal vertebrae 1 to 4), the chine bone (lumbar vertebrae 7), and the hip bone (ilium), and based on the identified positions, cutting by a cutting device through a half pig carcass part portion between the hip bone and the chine bone (backbone), the cut causing a middle portion of the half pig carcass part to be partly separated from the remaining half pig carcass part via gravity.

2. The method according to clause 1, further comprising: identifying the position between the tail bone and the hip bone, and performing a further cut between the tail bone and the hip bone.

3. The method according to clause 1, wherein the method further comprises the step of:

separating by the cutting device the half pig carcass portion connection between the middle part of the half pig carcass part along a curve along the muscle defining the ham cut to separate as much meat onto the middle portion as opposed to on the ham part, causing the ham part of the half pig carcass part to remain hanging in the carrier.

4. The method according to any of the preceding clauses, wherein detecting the at least one characteristic property of a half pig carcass part including positions of the bones in the rear portion of the half pig carcass part is performed by a detection apparatus.

5. The method according to clause 4, wherein the detection apparatus includes one or more of the following:

a laser scanner for scanning and generating a three-dimensional image data of one and/or both sides of the half pig carcass part, a digital imaging device for capturing three-dimensional image data of one and/or both sides of the half pig carcass part, and an X-ray apparatus for capturing X-ray data indicating inner bone structure of the half pig carcass part including the positions of the ribs of the half pig carcass part.

6. The method according to clauses 4 or 5, further comprising processing detected data using a control and processing unit connected to the detection apparatus to determine the positions of the tail bone (caudal vertebrae 1 to 4), the chine bone (lumbar vertebrae 7), and the hip bone (ilium).

7. An apparatus for processing a half pig carcass part that is at least partly freely hanging from a carrier, which carrier engages the hind leg part of the half pig carcass part, comprising:

a detection device for detecting at least one characteristic property of the half pig carcass part including positions of the bones in a rear portion of the half pig carcass part, an identification device for identifying positions of the tail bone (caudal vertebrae 1 to 4), the chine bone (lumbar vertebrae 7), and the hip bone (ilium), and based on the identified positions, a cutting device for cutting through a half pig carcass part portion between the hip bone and the chine bone (backbone), the cut causing a middle portion of the half pig carcass part to be partly separated from the remaining half pig carcass part via gravity.

8. The apparatus of clause 7, the apparatus further comprising:

the identification device being adapted to identify the position between the tail bone and the hip bone, and using this position information, the cutting device is adapted to perform a further cut between the tail bone and the hip bone.

The invention claimed is:

1. A method of processing a half pig carcass part that is at least partly freely hanging from a carrier, which carrier engages the hind leg part of the half pig carcass part, comprising:
   detecting positions of bones in a rear portion of the half pig carcass part,
   identifying positions of the tail bone, the chine bone, and the hip bone, and based on the identified positions,
   cutting by a cutting device through a half pig carcass part portion between the hip bone and the chine bone, the cut causing a middle portion of the half pig carcass part to be partly separated from the remaining half pig carcass part via gravity.

2. The method according to claim 1, wherein the cutting is through a joint.

3. The method according to claim 1, wherein the cutting is between the hip bone and the sacral vertebrae and/or wherein the cutting is between the sacral vertebrae and the chine bone.

4. The method according to claim 1, wherein the cutting is through the sacral iliac joint.

5. The method according to claim 4, further comprising: performing a further cut through the spine.

6. The method according to claim 1, further comprising:
   identifying the position between the tail bone and the hip bone, and
   performing a further cut between the tail bone and the hip bone.

7. The method according to claim 5, wherein the further cut is through a joint.

8. The method according to claim 1, wherein the method further comprises the step of:
   separating by the cutting device the half pig carcass portion connection between the middle part of the half pig carcass part along a curve along the muscle defining the ham cut to separate as much meat onto the middle portion as opposed to on the ham part, causing the ham part of the half pig carcass part to remain hanging in the carrier.

9. The method according to claim 1, wherein detecting positions of the bones in the rear portion of the half pig carcass part is performed by a detection apparatus.

10. The method according to claim 9, wherein the detection apparatus includes one or more of the following:
    a laser scanner for scanning and generating a three-dimensional image data of one and/or both sides of the half pig carcass part,
    a digital imaging device for capturing three-dimensional image data of one and/or both sides of the half pig carcass part, and
    an X-ray apparatus for capturing X-ray data indicating inner bone structure of the half pig carcass part including the positions of the ribs of the half pig carcass part.

11. The method according to claim 9, further comprising processing detected data using a control and processing unit connected to the detection apparatus to determine the positions of the tail bone, the chine bone, and the hip bone.

12. An apparatus for processing a half pig carcass part that is at least partly freely hanging from a carrier, which carrier engages the hind leg part of the half pig carcass part, comprising:
    a detection device for detecting positions of bones in a rear portion of the half pig carcass part,
    an identification device for identifying positions of the tail bone, the chine bone, and the hip bone, and based on the identified positions,
    a cutting device for cutting through a half pig carcass part portion between the hip bone and the chine bone, the cut causing a middle portion of the half pig carcass part to be partly separated from the remaining half pig carcass part via gravity.

13. The apparatus of claim 12, wherein the cutting device is arranged for cutting through a joint.

14. The apparatus of claim 11, the apparatus further comprising:
    the identification device being adapted to identify the position between the tail bone and the hip bone, and using this position information, the cutting device is adapted to perform a further cut between the tail bone and the hip bone.

15. Use of an apparatus according to claim 12, for processing a half pig carcass part that is at least partly freely hanging from a carrier.

* * * * *